United States Patent [19]

Barnes et al.

[11] Patent Number: 5,280,621
[45] Date of Patent: Jan. 18, 1994

[54] PERSONAL COMPUTER HAVING DEDICATED PROCESSORS FOR PERIPHERAL DEVICES INTERCONNECTED TO THE CPU BY WAY OF A SYSTEM CONTROL PROCESSOR

[75] Inventors: Brian C. Barnes, Benton Harbor; Mark J. Foster, Stevensville; Lloyd W. Gauthier; Saifee Fakhruddin, both of St. Joseph; David J. DeLisle, Berrien Springs, all of Mich.; David R. Veit, Granger, Ind.

[73] Assignee: Zenith Data Systems Corporation, Buffalo Grove, Ill.

[21] Appl. No.: 19,997

[22] Filed: Feb. 17, 1993

Related U.S. Application Data

[63] Continuation of Ser. No. 459,042, Dec. 29, 1989, abandoned.

[51] Int. Cl.$^5$ ............................................. G06F 13/12
[52] U.S. Cl. .................................... 395/800; 395/500; 395/725; 364/DIG. 1; 364/232.3; 364/238.3; 364/240
[58] Field of Search ............... 395/275, 325, 500, 725, 395/800

[56] References Cited

U.S. PATENT DOCUMENTS

| | | | |
|---|---|---|---|
| 4,181,974 | 1/1980 | Lemay et al. | 364/900 |
| 4,200,930 | 4/1980 | Rawlings et al. | 364/200 |
| 4,417,304 | 11/1983 | Dinwiddie, Jr. | 364/200 |
| 4,418,382 | 11/1983 | Larson et al. | 364/200 |
| 4,470,114 | 9/1984 | Gerhold | 364/200 |
| 4,485,438 | 11/1984 | Myrmo et al. | 364/200 |
| 4,631,666 | 12/1986 | Harris et al. | 364/200 |
| 4,654,788 | 3/1987 | Boudreau et al. | 364/200 |
| 4,663,706 | 5/1987 | Allen et al. | 364/200 |
| 4,672,570 | 6/1987 | Benken | 395/200 |
| 4,720,784 | 1/1988 | Radhakrishnan | 364/200 |
| 4,736,319 | 4/1988 | DasGupta et al. | 395/325 |
| 4,783,733 | 11/1988 | Greig et al. | 364/200 |
| 4,792,896 | 12/1988 | Maclean et al. | 395/500 |
| 4,807,184 | 2/1989 | Shelor | 364/900 |
| 4,942,606 | 7/1990 | Kaiser et al. | 380/4 |
| 4,961,140 | 10/1990 | Pechanek et al. | 364/200 |
| 4,972,368 | 11/1990 | O'Brien et al. | 364/900 |
| 4,974,166 | 11/1990 | Maney et al. | 364/478 |
| 4,994,963 | 2/1991 | Rorden et al. | 395/725 |
| 5,001,704 | 3/1991 | Narup et al. | 370/85.13 |
| 5,060,140 | 10/1991 | Brown et al. | 364/200 |
| 5,086,385 | 2/1992 | Launey et al. | 364/188 |
| 5,121,382 | 6/1992 | Yang et al. | 370/31 |

*Primary Examiner*—Thomas C. Lee
*Assistant Examiner*—Mehmet Geckil
*Attorney, Agent, or Firm*—Fitch, Even, Tabin & Flannery

[57] ABSTRACT

A plurality of processors form a network used to communicate with one or more peripheral devices and the system control processor. One processor is dedicated to at least one peripheral device. Since the system control processor is not burdened with the relatively slow communications protocol with the peripheral devices, it is free to do other tasks which improves the overall system performance. Communication protocol between the dedicated processors allows for local and global communication.

22 Claims, 5 Drawing Sheets

SOURCE BYTE

FIG. 5

DEST/CMD BYTE

FIG. 6

DATA BYTE

PERSONAL COMPUTER HAVING DEDICATED PROCESSORS FOR PERIPHERAL DEVICES INTERCONNECTED TO THE CPU BY WAY OF A SYSTEM CONTROL PROCESSOR

This application is a continuation of application Ser. No. 07/459,042, filed Dec. 29, 1989, now abandoned.

CROSS REFERENCE TO RELATED APPLICATIONS

This application is related to an application for a FAST SWITCHING MEMORY MODE SYSTEM, Ser. No. 07/459,055, filed on Dec. 29, 1989 continued as application Ser. No. 07/735,619, filed on Jul. 25, 1991 and assigned to the same assignee as the present invention.

BACKGROUND OF THE INVENTION

1. Field of the Invention

This invention relates to personal computers, and more particularly personal computers having a network of microcontrollers, each tied to one or more peripheral devices, such as a keyboard, which communicate with the system control processor (also known as a keyboard controller in an IBM or IBM compatible machine) to improve the overall system performance by eliminating the relatively slow peripheral communication with the system control processor and freeing up the system control processor for other tasks.

2. Description of the Prior Art

IBM type PC/AT compatible personal computers utilize a separate microprocessor as a system control processor (SCP). The SCP provides an interface between the host processor or CPU and peripherals, such as a keyboard. More specifically, the SCP handles the communication between the CPU and the keyboard. The IBM defined communication protocol between the keyboard and the SCP is relatively slow. Consequently, when the SCP is preoccupied with keyboard communication, it must finish that task before it can go on to other tasks. Accordingly, this keyboard interfacing task limits the overall system performance because the CPU must wait for the SCP to become free again.

Figure 1:
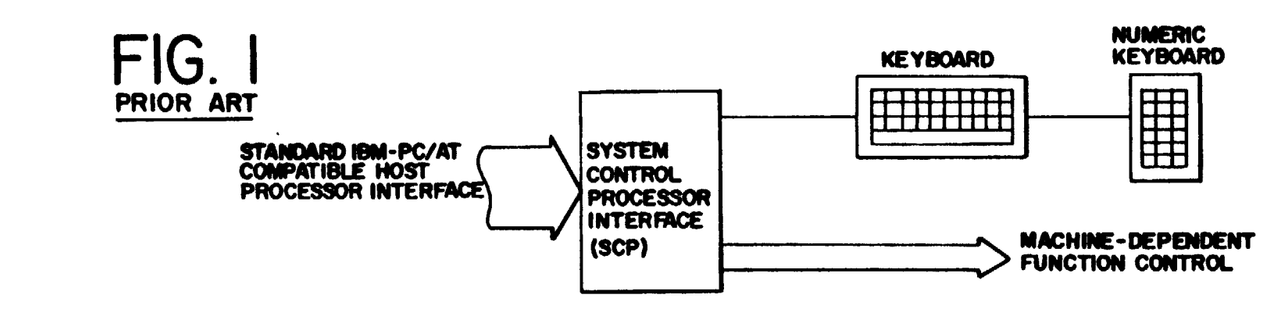
FIG. 1 is a block diagram illustrating the interface between the CPU and the keyboard in known personal computers.

Many known PC/AT type personal computers utilize an Intel type 8042 microprocessor as an SCP. The original PC type AT personal computers were introduced in 1983 with an Intel 80286 microprocessor. The 80286 microprocessors operated originally at 6 megahertz. In that environment, the use of an Intel type 8042 as a system control processor is adequate. However, personal computers today are much faster than the original IBM PC/AT computer. For example, some personal computers utilize an Intel 80386 as a CPU, which has an operating speed up to 33 megahertz. In such machines, the existing architecture, as shown in FIG. 1, can intensify the problems mentioned above and consequently severely limit the system performance. In addition to the problems mentioned above, newer machines, particularly the portable laptop type computers place additional burdens on the SCP. For example, in such computers, the SCP's tasks include battery power management, external bus expansion control and video functions such as backlighting control and LCD/CRT device selection. These additional tasks further degrade system performance.

SUMMARY OF THE INVENTION

It is an object of the present invention to provide a personal computer which solves the problems of the prior art.

It is another object of the present invention to improve the overall system performance of a personal computer.

It is yet another object of the present invention to utilize a separate microcontroller for one or more peripheral devices, such as a keyboard.

It is yet another object of the present invention to provide a network of microcontrollers for controlling peripheral devices.

It is yet a further object of the present invention to improve the overall system performance of an IBM PC/AT compatible computer.

DESCRIPTION OF THE DRAWING

These and other objects and advantages of the present invention will become readily apparent upon consideration of the following detailed description of the attached drawing wherein.

DETAILED DESCRIPTION

The present invention relates to utilizing a network of microcontrollers 20, 22, 24 and 36 (eight, for example) to provide communication between peripheral devices through their respective microcontrollers, such as a keyboard 26, a numeric keypad 28, an external keyboard 30 or other peripheral devices 32. The microcontrollers 20, 22 and 24 are connected in a network, hereinafter referred to as KEYNET, shown within the dashed box 34 in FIG. 2. Each KEYNET processor is dedicated to one or more peripherals. The KEYNET bus 34 is, in turn, connected to the SCP 36. The SCP 36, which may be an Intel 8051 (or a derivative thereof), communicates with the CPU through a system control processor interface SCPI 38 in much the same manner as the old 8042 architecture. The SCPI 38 is described in detail in copending application Ser. No. 07/459,055, filed on even date now abandoned in favor of continuation application Ser. No. 08/031,029 now pending hereby incorporated by reference and copending application Ser. No. 07/735,619, filed on Jul. 25, 1991, both assigned to the same assignee as the present invention.

Figure 2:
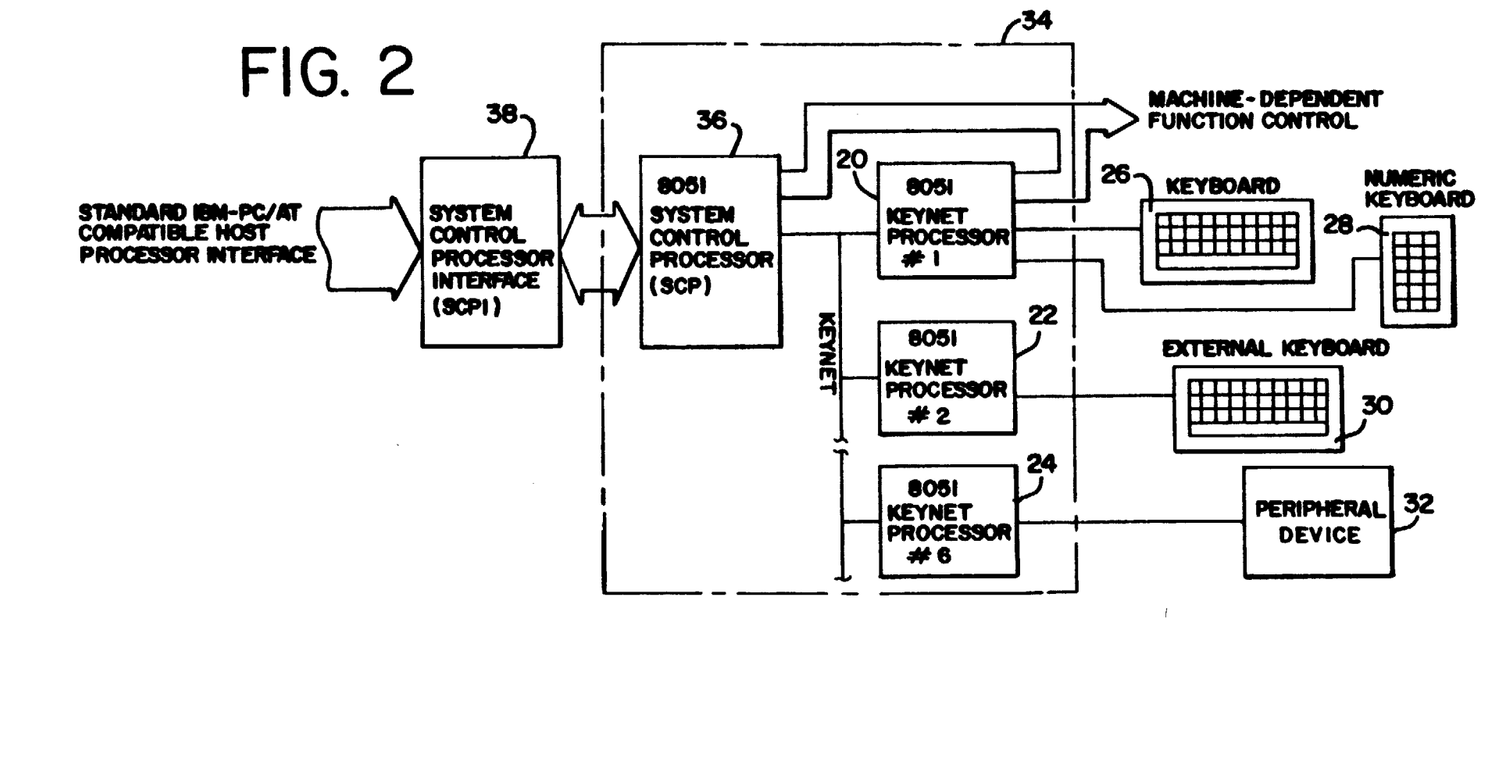
FIG. 2 is a block diagram illustrating the architecture in accordance with the present invention.

Each microcontroller 20, 22 and 24 operate relatively faster than an Intel 8042, thus providing a much more efficient interface between the peripheral devices 26, 28, 30 and 32. For example, an Intel 8051 may be used for the microcontrollers 20, 22, 24 and 36. Additionally, the Intel 8051 executes equivalent instructions as the Intel 8042 but approximately 25% faster. Other advantages of the Intel 8051 over the Intel 8042 is that its instruction set is much more versatile and efficient. Lastly, the Intel 8051 includes an on-board serial communications interface.

All microcontrollers are interfaced to the KEYNET bus by way of a serial port and a bidirectional input/output line hereinafter referred to as a /BUSY line, as available in Intel type 8051 microcontrollers. However, it should also be understood that any device which can emulate an Intel type 8051 serial port and also provide a bidirectional line suitable as a /BUSY line can also be used.

All devices connected to the KEYNET bus must also be able to operate at a baud rate between 187 Kbps to 1 Mbps and have the following serial protocol: 1 start bit (low); 8 data bits, 1 programmable ninth data bit and 1 stop bit (high).

An important aspect of the invention relates to the communication between the SCP 36 and the peripheral devices 26, 28, 30 and 32. Instead of communicating directly with the peripheral devices, such as in the case of the 8042 architecture illustrated in FIG. 1, the SCP 36 communicates with a KEYNET processor 20, 22 or 24. In this mode, the KEYNET processors 20, 22 or 24 will look and act like a keyboard to the SCP 36. However, the SCP 36/KEYNET interface is much faster than the SCP 36/keyboard 26 interface.

The KEYNET processors 20 and 22 are assigned the task of communicating with the peripherals, such as the keyboards 26 and 30 utilizing the well known relatively slow IBM defined communication protocol. The KEYNET processors 20, 22 and 24 look like system control processors to the peripherals. Since the SCP 36 no longer has the peripherals to slow it down, the SCP 36 is free to do other tasks which are much more important in terms of system performance.

There are various advantages of the KEYNET architecture over the 8042 type architecture. These advantages include improving the speed of the system. This is accomplished by removing the relatively slow IBM defined keyboard communication procedure from the system control processor and placing it where speed is not critical. The system throughout is also increased by decreasing the SCP workload by sharing tasks with the KEYNET processors. Other advantages of the KEYNET architecture relate to expansion and diagnostic capabilities. Specifically, more than one keyboard and keypad can be connected to the system as well as other types of peripherals as needed. Also the KEYNET architecture allows for much simplified testing of variables that are traditionally more difficult to test.

Figure 7:
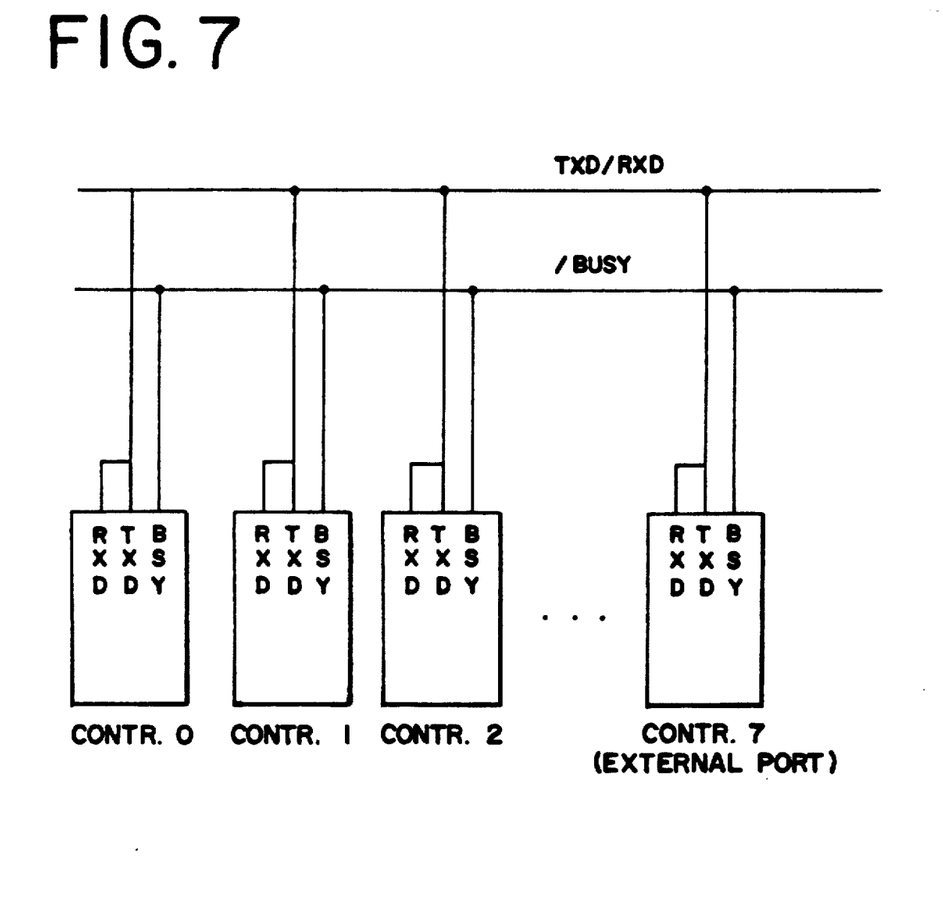
FIG. 7 is a schematic diagram of the system in accordance with the present invention.

As heretofore stated, Intel type 8051 microcontrollers have an on-board serial communications port which includes a transmit line (TXD) and a receive line (RXD). As best shown in FIG. 7, all of the transmit and receive lines TXD and RXD are tied together on a common TXD/RXD bus forming a network. These microcontrollers also include a bidirectional busy (BUSY) line which is used to reduce contention of the TXD/RXD line by multiple controllers.

SYSTEM PROTOCOL

The system protocol defines the methods at which the SCP 36 and the various KEYNET processors 20, 22, 24 and 36 communicate with each other. The protocol also defines various address, command and data codes that are interpreted and understood by the SCP 36 and by all of the KEYNET processors 20, 22 and 24 that operate on the KEYNET system. The KEYNET's protocol consists of gaining exclusive control of the KEYNET bus through a simple arbitration process and then transmitting as many variable length data packets as required as illustrated, for example, in FIG. 3. Each data packet may consist of a source string, a command/destination string and may optionally include one or more data strings.

Figure 3:
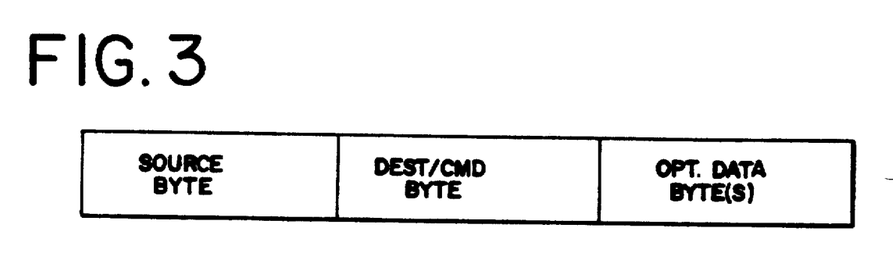
FIG. 3 is a functional representation of a data packet used as the communication protocol between the microcontroller network illustrated in FIG. 2.

Once the KEYNET processor is finished transmitting a data packet, it releases control of the KEYNET bus. The SCP 36 and the KEYNET processors 20, 22 and 24 do not have to release control of the KEYNET bus after sending only one data packet. Several data packets of different types or destinations can be transmitted by the SCP 36 or the KEYNET processors 20, 22 and 24 as long as control of the KEYNET bus is not relinquished.

In order to prevent contention among the SCP 36 and various KEYNET processors 20, 22 and 24, an arbitration process is used. In cases where contention occurs, the protocol resolves the contention and awards control of the KEYNET bus to a particular KEYNET processor 20, 22, 24 or 36 having the highest priority.

The protocol also defines a standard procedure to receive data packets from the KEYNET system. In an 8042 type architecture, the SCP 36 communicates directly with the peripheral devices 26, 28, 30 and 32. However, with the KEYNET architecture, the SCP 36 is isolated from the peripheral devices 26, 28, 30 and 32. Each peripheral device 26, 28, 30 and 32 is interfaced to the SCP 36 by way of their respective KEYNET processor 20, 22 and 24. Thus, a KEYNET processors 20, 22 and 24 act like a peripheral device when communicating with the SCP 36 and like an SCP when communicating with a peripheral device 26, 28, 30 or 32.

Figure 4:
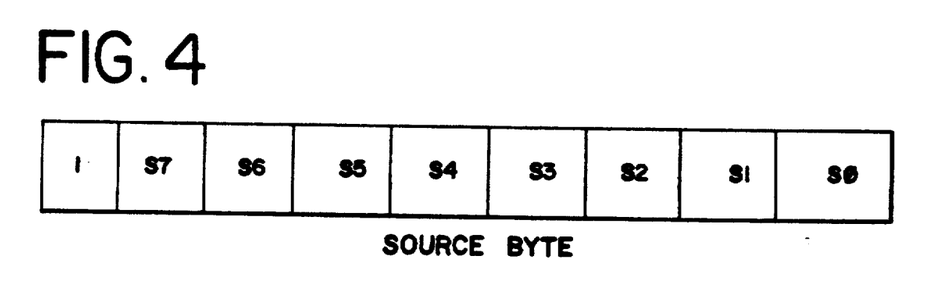
FIG. 4 is a representation of a source byte portion of the data packet illustrated in FIG. 3.

The source byte portion of the data packet is illustrated in FIG. 4 and includes 8 bits (S0-S7) and a programmable 9th bit. An important feature of an Intel type 8051 is the ability to provide a programmable ninth data bit allowing for multiprocessor communications. This is described in detail in 1989 INTEL 8-BIT EMBEDDED CONTROLLER HANDBOOK, Page 8-35 which is herein incorporated by reference. All source bytes utilize a "1" in the 9th data bit position.

The source byte is encoded to indicate which KEYNET processor is the transmitter. It is also used to help determine if there has been a collision with another KEYNET processor on the KEYNET network. Each KEYNET processor 20, 22, 24 and 36 is assigned a unique bit position within the source byte. The bit assignments for the 7 controllers and an external port are defined in TABLE I.

TABLE I

| SOURCE CONTROLLER ADDRESS NUMBERS | |
|---|---|
| S7----S0 | Controller # |
| 11111110 | 0* |
| 11111101 | 1 |
| 11111011 | 2 |
| 11110111 | 3 |
| 11101111 | 4 |
| 11011111 | 5 |

TABLE I-continued

| SOURCE CONTROLLER ADDRESS NUMBERS | |
|---|---|
| S7----S0 | Controller # |
| 10111111 | 6 |
| 01111111 | Ext. Port |

*The SCP 36 may be treated as a KEYNET address mode.

Figure 5:
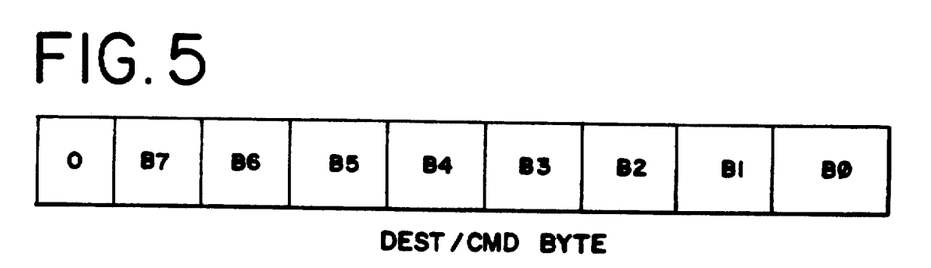
FIG. 5 is a representation of the destination command byte portion of the data packet illustrated in FIG. 3.
Figure 6:
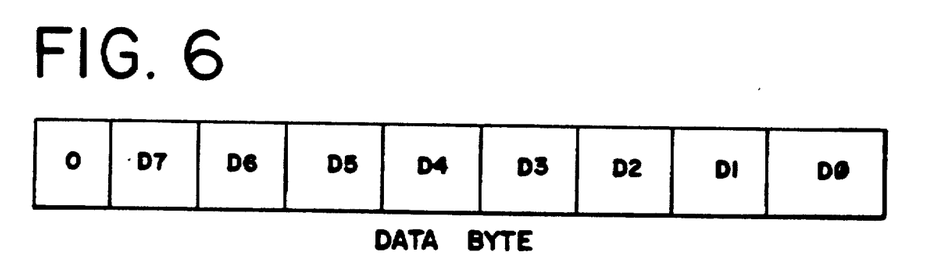
FIG. 6 is a representation of the data byte portion for the data packet illustrated in FIG. 3.

The destination command byte portion of the data packet is illustrated in FIG. 5 and includes 8 data bits (B0-B7) and a zero in the 9th data bit position. The destination/command byte allows for local and global addressing. More specifically, the KEYNET processors 20, 22, 24 and 36 can transmit a data packet either to another KEYNET processor in a local mode or to all of the KEYNET processors in a global mode. Bit B7 of the destination command byte DEST/CMD determines how the data packets are to be addressed. A "0" in bit B7 represents the local mode. A "1" in bit B7 r presents the global mode.

LOCAL MODE

The local mode prevents other KEYNET processors from being interrupted unnecessarily. In the local mode, bits B4-B6 of the destination command DEST/CMD byte identifies the KEYNET processor 20, 22 or 24 to be addressed as shown in TABLE II.

TABLE II

| B6-B4 (HEX) | Addressed Controller |
|---|---|
| 0 | Controller 0 |
| 1 | Controller 1 |
| 2 | Controller 2 |
| 3 | Controller 3 |
| 4 | Controller 4 |
| 5 | Controller 5 |
| 6 | Controller 6 |
| 7 | External Port |

Bits B3-B0 of the destination command byte indicates a specific local command as shown in TABLE III.

TABLE III

The following Local Mode commands originate from any of the processors on KEYNET and are directed to any other single processor. The following commands are merely intended to be exemplary:

| B3-B0 HEX CMD | LOCAL MODE COMMAND DESCRIPTION |
|---|---|
| 0 | SCP-KBD CMD/DATA sequence to follow |
| 1 | Execute Keyboard I/F test |
| 2 | Enable Keyboard Interface |
| 3 | Disable Keyboard Interface |
| 4 | Keyboard I/F test result byte to follow |
| 5 | Set Averaged Battery Sample Return Rate |
| 6 | A/D averaged sample to follow |
| 7 | Keyboard parity error occurred |
| 8 | Return KEYNET controller ID/Manufacturing Mode |
| 9 | Keyboard transmit timeout occurred |
| A | Keyboard receive timeout occurred |
| B | Reserved |
| C | Reserved |
| D | Reserved |
| E | Reserved |
| F | Extended Command Set |

Definitions of the local commands are as follows:

Command Function 0: SCP-KBD CMD/DATA SEQUENCE—This command indicated that the data bytes that follow are command or data bytes as normally seen in keyboard-SCP type communications.

These sequences are defined by IBM or Zenith Data Systems (ZDS) and include:
1. ZDS defined SCP-to-keyboard commands in range 80-BFh (ZDS machine dependent)
2. IBM defined SCP-to-Keyboard commands in range ED-FFH
3. Other keyboard-to-SCP communication:

| | |
|---|---|
| Key detection Error/Overrun bytes: | 00 or FF |
| Keyboard ID bytes, example: | 83AB |
| Keyboard (basic assurance test (BAT) completion code: | AA |
| Keyboard BAT failure code: | FC |
| Echo | EE |
| ACK | FA |
| Resend/NAK | FE |
| Valid keyboard of scansets 1, 2, 3 | |
| Values returned in response to an SCP command | |

Command Function 1: EXECUTE KEYBOARD I/F TEST - This command indicates that the source controller wants the addressed controller to perform a keyboard interface test and that no data bytes follow. In this mode, the source controller expects a return value indicating a test result. See "KEYBOARD I/F TEST RESULTS" command.

Command Function 2: ENABLE KEYBOARD I/F - This command indicates that the source controller wants the addressed controller to enable its keyboard value interface by releasing the 'CLK' line and that no data bytes follow.

Command Function 3: DISABLE KEYBOARD I/F - This command indicates that the source controller wants the addressed controller to disable its keyboard interface by driving the 'CLK' line low and that no data bytes follow.

Command Function 4: KEYBOARD I/F TEST RESULTS - This command indicates that the data byte following is the result of a previously requested keyboard interface test results byte, defined below.

| Keyboard I/F Test Results byte 0 D7 D6 D5 D4 D3 D2 D1 D0 | |
|---|---|
| Value (Hex) | Keyboard I/F Test Results |
| 00 | No error detected |
| 01 | 'CLK' stuck low |
| 02 | 'CLK' stuck high |
| 03 | 'DATA' stuck low |
| 04 | 'DATA' stuck high |

Command Function 5: SET AVERAGED BATTERY SAMPLE RETURN RATE - This command indicates that the data byte following is a rate at which the SCP wants an average of the battery voltage samples returned. The data byte value is the return rate in increments of 200 ms, i.e., 64H = 100 * 200 mS = 20 seconds.

Command Function 6: A/D AVERAGED SAMPLE - This command indicates that the data byte following is an average of all battery voltage samples accrued during any particular sample averaging period. A sample averaging period is defined by the SCP in the "SET AVERAGED BATTERY SAMPLE RETURN RATE" command.

Command Function 7: KEYBOARD PARITY ERROR - This command indicates that a parity error occurred in the communication between the source controller and its attached keyboard and that no data bytes follow.

Command Function 8: RETURN KEYNET CONTROLLER ID/MFG MODE - This command indicates that the controller identified in the SOURCE byte is on-line with the KEYNET and that no data bytes follow.

Command Function 9: KEYBOARD TRANSMIT TIMEOUT - This command indicates that a keyboard transmit timeout occurred and that no data bytes follow.

Command Function A: KEYBOARD RECEIVE TIMEOUT - This command indicates that a keyboard receive timeout occurred and that no data bytes follow.

Command Function B: Reserved for future use.
Command Function C: Reserved for future use.
Command Function D: Reserved for future use.
Command Function E: Reserved for future use.
Command Function F: EXTENDED COMMAND SET - This command indicates that the following byte is being used to identify a command or function. This feature is necessary only if functions 0 through E of this command set table are fully utilized and additional commands are required.

GLOBAL MODE

In the global address mode, all KEYNET processors 20, 22 and 24 are addressed by the source processor at one time. The lower 7 bits (B6-B0) of the command data byte are used to identify commands and functions. TABLE IV illustrate an exemplary command set in the global mode. Some of the commands and responses require optional data bytes. The data bytes include bits D0-D7 and the optional 9th data bit set at "0". The data bytes can take on any value between 0-FFh.

TABLE IV

The global command sets are are as follows:

| B6-B0 HEX CMD | GLOBAL MODE COMMAND DESCRIPTION |
| --- | --- |
| 00 | SCP-KBD CMD/DATA sequence to follow |
| 01 | Execute keyboard interface test |
| 02 | Enable keyboard interface |
| 03 | Disable keyboard interface |
| 04 | reserved for future use |
| . | . |
| . | . |
| . | . |
| 7F | reserved for future use |

Global Command Set

Command Function 0: SCP-KBD CMD/DATA SEQUENCE - Indicates that the DATA bytes to follow are command or data bytes as normally seen in keyboard-SCP type communications. These sequences are defined by IBM or ZDS and include:
1. ZDS defined SCP-to-keyboard commands in range 80-BFh (ZDS machine dependent)
2. IBM defined SCP-to-keyboard commands in range ED-FFh
3. Other keyboard-to-SCP communication:

| | |
| --- | --- |
| Key Detection Error/Overrun | 00 or FF |

-continued

| bytes: | |
| --- | --- |
| Keyboard ID bytes, example: | 83AB |
| Keyboard BAT completion code: | AA |
| Keyboard BAT failure code: | FC |
| Echo | EE |
| ACK | FA |
| Resend/NAK | FE |
| Valid keyboard scan codes of scansets 1, 2, 3 | |
| Values returned in response to an SCP command | |

Command Function 1: EXECUTE KEYBOARD I/F TEST - Indicates that the source controller wants all controllers with keyboards to perform a keyboard interface test. No DATA bytes to follow. Source controller expects a return value indicating test results. See "KEYBOARD I/F TEST RESULTS" command.

Command Function 2: ENABLE KEYBOARD I/F - Indicates that the source controller wants all controllers to enable their keyboard interfaces by releasing their 'CLK' lines. No DATA bytes to follow.

Command Function 3: DISABLE KEYBOARD I/F - Indicates that the source controller wants all controllers to disable their keyboard interfaces by driving their 'CLK' lines low. No DATA bytes to follow.

TRANSMISSION INITIATION AND COLLISION PREVENTION

In order to initiate transmission of a data packet over the KEYNET bus, the source KEYNET processor must first read the /BUSY line to see if another KEYNET processor is using the KEYNET bus. If the /BUSY line is active low, this represents that another KEYNET processor already has control of the KEYNET bus. In this situation, the initiating KEYNET processor will have to postpone transmission until it can successfully arbitrate control of the KEYNET bus later. If the BUSY line is inactive high, then the source KEYNET processor can proceed with transmitting a data packet using the KEYNET bus. The source processor will first pull the /BUSY line low and transmit the source byte of the data packet.

Each of the KEYNET processors have their TXD lines wired directly to the RXD lines as shown in FIG. 7 so that the transmitted byte can be read back by the transmitting processor and checked for accuracy. If the byte that is read back is the same as the byte that was transmitted, then there is no contention for the KEYNET bus and the source KEYNET processor will have exclusive control. If the byte received on the RXD line is not the same as the byte transmitted, then a collision must have occurred indicating that there is a contention for the KEYNET bus. Any transmitting source processor will be able to detect the collision.

The only instance where a data packet collision is expected to occur is when more than one KEYNET processor seeks control of the KEYNET bus during a small time window between reading the /BUSY line and pulling the /BUSY line active low. When this happens, each KEYNET processor sees an inactive /BUSY line high which indicates that it is free to take control of the KEYNET bus. It is during the subsequent transmission of the source bytes from the respective KEYNET processors that the contention is discovered.

An arbitration scheme is used to resolve the contention. This arbitration scheme utilizes the relatively simple method to determine the priority of the contending KEYNET processors. A unique mask is used. For example, the mask for KEYNET processor 2 would be 00000011. This mask is ANDed with the RXD value seen at each RXD line. For example, if KEYNET processor 0, 2 and 5 contend for bus control, the RXD value (i.e., result at each of the RXD pins) would be a 1101 1010 as shown below.

| Source byte for controller 0 | 1111 1110 |
|---|---|
| Source byte for controller 2 | 1111 1011 |
| Source byte for controller 5 | 1101 1111 |
| Result | 1101 1010 |

After the ANDing operation, the microcontroller having a resultant value less than the original mask loses the arbitration. The winner of the arbitration continues to hold the /BUSY line and transmit as required. KEYNET processors losing the bus arbitration release the /BUSY line and try their transmission later.

An exception to this arbitration scheme is when the SCP 36 is involved in the collision. The SCP is assigned the highest priority on the KEYNET bus Thus, it will win the arbitration. In this case, the SCP 36 will hold the /BUSY line and retransmit its source byte and again verify that it was not corrupted on the KEYNET bus.

Figure 8:
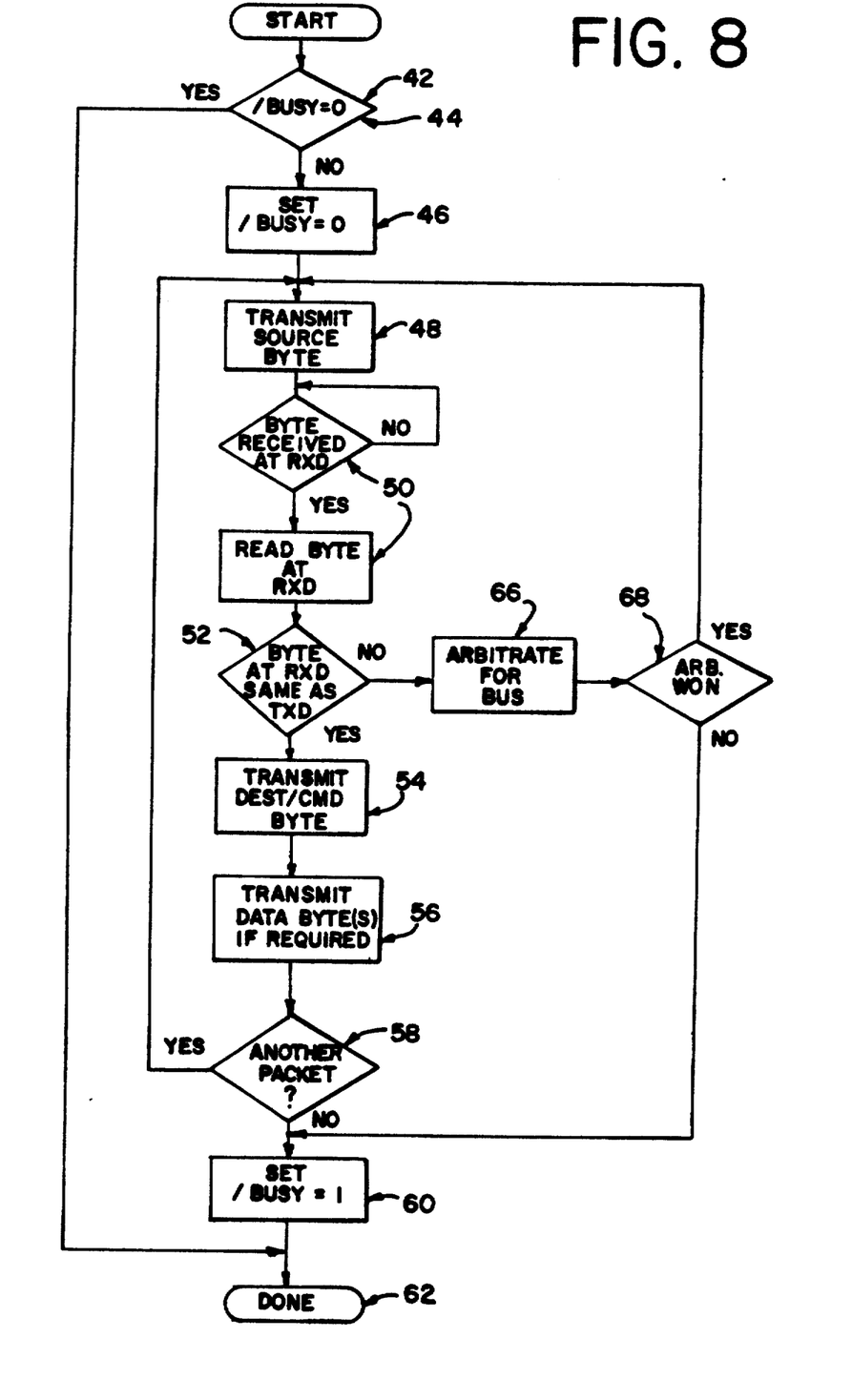
FIG. 8 is a flow chart illustrating the means for indicating transmission of a data packet in accordance with the present invention.

The procedure for initiating a transmission is illustrated in FIG. 8. In the first step 42 the initiating KEYNET processor checks the /BUSY line. If the /BUSY line is active low in step 44, this means another KEYNET processor has control of the KEYNET and the system proceeds to step 62. If the /BUSY line is inactive high the initiating KEYNET processor pulls the /BUSY line low in step 46. The source byte is then transmitted in step 48 and read back in step 50 to determine its accuracy. If the received byte is determined to be different than the transmitted byte in step 52, the system assumes there is a bus contention and proceeds to step 66 where the contending processor arbitrates for bus control. In step 68 the winner of the arbitration proceeds to step 48 and transmits the source byte. The loser of the arbitration proceeds to step 60 and releases the /BUSY line.

If the transmitted source byte is determined to be the same as the received source byte in step 54, the DEST/CMD byte is transmitted. Next, in step 56, data byte(s) are transmitted as required. As previously mentioned, more than one data packet can be transmitted while a particular KEYNET processor has control of the KEYNET bus. Thus, if there are additional data packets to be transmitted as determined in step 58, the system repeats steps 48-58. If there are no additional data packets to be transmitted, the KEYNET processor releases the /BUSY line in step 60 and either returns to its main task in step 62 and returns to step 42.

PACKET RECEPTION

All KEYNET processors on the KEYNET bus are required to receive the SOURCE byte and DEST/CMD byte of every data packet transmitted. This is necessary to insure that each KEYNET processor is able to determine the source of the transmission when they are the addressed processor. In the event that the source processor is requesting a value to be returned, the addressed processor must know where the value is to be returned.

The optical data bytes of the data packet are only received by the addressed processors. In order to implement the scheme of selecting which bytes in the packet are seen by the individual processor, KEYNET takes advantage of a special microprocessor communications feature in the Intel 8051 serial port. The details of this feature are described in detail in Intel 1989 INTEL 8-bit EMBEDDED CONTROLLER HANDBOOK, page 8-35, hereby incorporated by reference.

Figure 9:
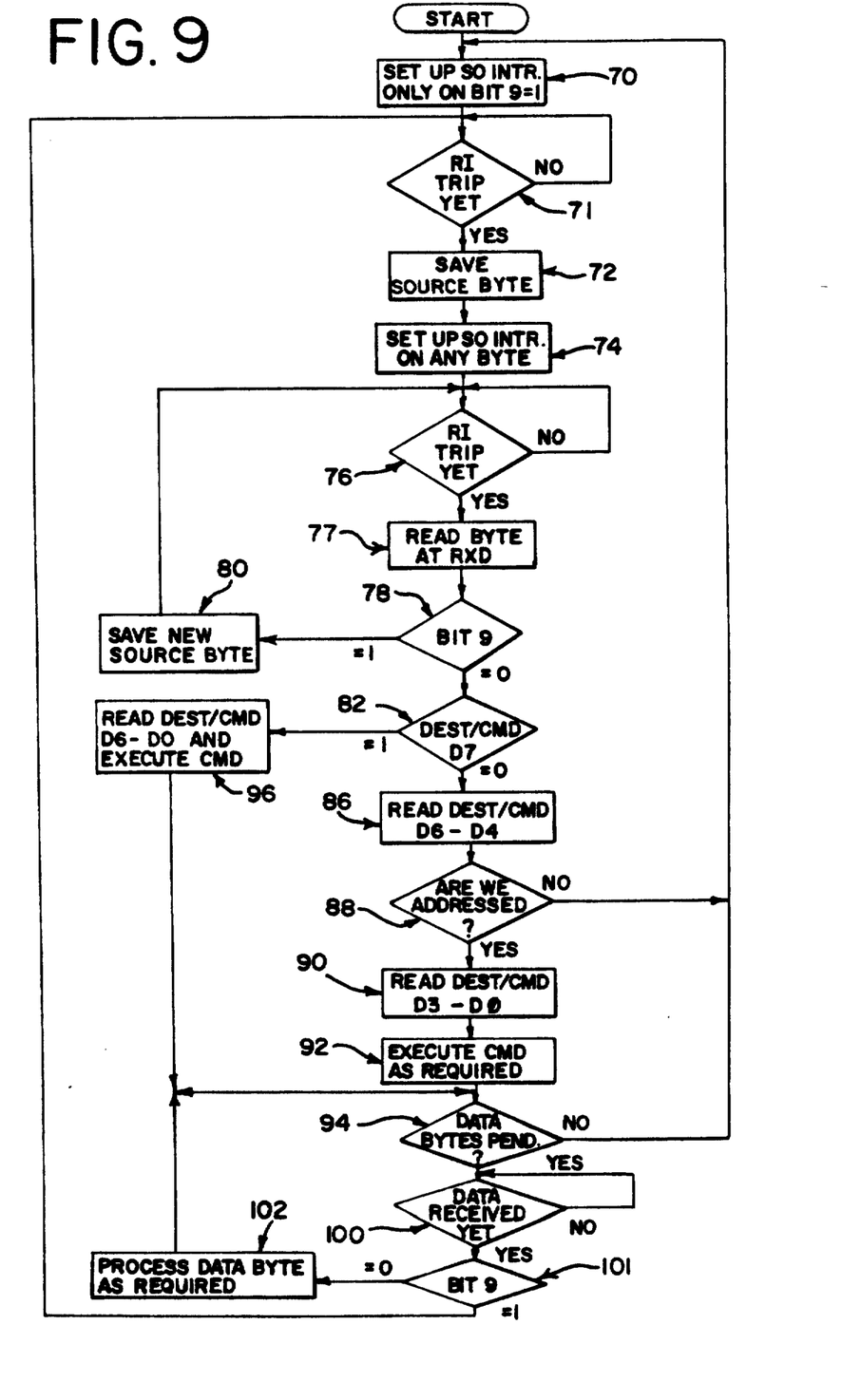
FIG. 9 is a flow chart illustrating means for receiving a data packet in accordance with the present invention.

The procedure for receiving a serial data byte is shown in FIG. 9. In the first steps 70 and 71, the serial ports of the KEYNET processors 20, 22 and 24 are set up so that the receive interrupt RI is tripped only when the 9th bit is a 1. In the next step 72, when a receive interrupt RI is received, the SOURCE byte is stored. In step 74, the serial port is set such that any incoming byte trips the receive interrupt RI. After the receive interrupt RI is tripped, as indicated by step 76, the 9th bit is inspected in steps 77 and 78. If the 9th bit is a "0", this indicates that is DEST/CMD byte causing the system to proceed to step 82. If not, the system assumes it is another SOURCE byte which must be stored in place of the previous SOURCE byte and thus proceeds to step 80. Once the SOURCE byte is stored, system proceeds back to step 76. In step 82, bit D7 of the SOURCE byte is inspected to determine it if is a global address. If it is a global address, the system proceeds to step 96, where the DEST/CMD bits D6-D0 are read and the command is executed. Otherwise, the system assumes that it is a local processor address. If it is a local processor address, the SOURCE bits D6-D4 are read in step 86 to determine the local processor address. For processors which are not addressed, as indicated by step 88, they return to step 70. For the local processor that is addressed, the source bits D3-D0 are read in step 90 to obtain the command/function nibble. In step 92, the command/function nibble is interpreted and executed as required. If no data bytes are pending, as indicated by step 94, the system returns to step 70 where the serial port is set up to trip the receive interrupt only on a source address byte (i.e., when the 9th bit is 1). If data bytes are expected, the 9th bit of the expected data byte is read in steps 100 and 101 to determine if it is a new data byte or a new SOURCE byte. If it is a DATA byte, then it is processed in step 102 and the system returns back to step 94. Otherwise, if it is a SOURCE bit as determined in step 101, the system returns to step 71.

Obviously, many functions and variations of the present invention are possible in light of the above teachings. Thus it is to be understood that within the scope of the appended claims, the invention may be practiced otherwise than as specifically designated above.

What is claimed and desired to be secured by a Letters Patent is:

1. A personal computer comprising:
   a central processing unit for processing data, disposed within said personal computer;
   one or more peripheral devices for communicating with said CPU; and
   means for interfacing said peripheral devices with said CPU, said interfacing means including a system control processor (SCP) for communicating with said CPU and performing one or more other predetermined functions and one or more dedicated processors, said SCP and said one or more dedicated processors disposed within said personal computer, said interfacing means further including first communication means for allowing said SCP to communicate with said CPU, said first communication means including means for controlling the transfer of data between said SCP and said CPU, each of said dedicated processors being connected to at least one of said peripheral devices, said interfacing means further including second communication means for allowing communication between each of said dedicated processors and their associated peripheral devices, said second communication means including means for controlling the transfer of data between said peripheral devices and said SCP, said second communication means including means for allowing said SCP and said one or more dedicated processors to be interconnected by way of a serial bus forming a network; and third communication means for allowing and controlling serial communication between said dedicated processors and said SCP along said network.

2. A computer system as recited in claim 1, wherein said first allowing means includes first communication means for allowing said dedicated processors and said peripheral devices to communicate in a first protocol.

3. A computer system as recited in claim 2, wherein said second allowing means includes second communication means for allowing said dedicated processors and said system control processor to communicate in a second protocol.

4. A computer system as recited in claim 3, wherein said first protocol is different from said second protocol.

5. A computer system as recited in claim 4, wherein said second protocol is relatively faster than said first protocol.

6. A computer system as recited in claim 3, wherein said second protocol enables said dedicated processors to communicate with variable length, data packets.

7. A computer system as recited in claim 3, wherein said second protocol comprises a data packet which includes a source byte and a destination/command byte.

8. A computer system as recited in claim 7, further including means for allowing said destination/command byte to be received by one dedicated processor at one time.

9. A computer system as recited in claim 7, further including means for allowing said destination/command to be received by more than one dedicated processors at one time.

10. A computer system as recited in claim 7, wherein said second protocol further includes one or more data bytes.

11. A computer system as recited in claim 7, further including means for allowing multiple data packets to be transmitted by a single dedicated processor in succession.

12. A computer system as recited in claim 1, further including means for arbitrating between said dedicated processors when more than one processor is contending for the network at substantially the same time.

13. A computer system as recited in claim 12, further including means for providing a unique mask, for each dedicated processor.

14. A computer system as recited in claim 12, further including means for detecting collisions between contending dedicated processors.

15. A computer system as recited in claim 12, further including means for assigning a predetermined priority to each dedicated processor.

16. A computer system as recited in claim 15, wherein said arbitrating means includes determining means for determining the dedicated processor with the highest priority and for awarding control of the network to the dedicated processor having the highest priority.

17. A computer system as recited in claim 15, further including means for assigning the highest priority to the system control processor.

18. A personal computer comprising:
a central processing unit (CPU) for processing data, disposed within said personal computer;
a plurality of peripheral devices for communicating with said CPU;
a plurality of dedicated processors disposed within said personal computer, each of said dedicated processors being connected to one of said peripheral devices, said dedicated processors being interconnected with each other by way of a serial bus forming a network;
a system control processor (SCP) disposed within said personal computer, connected to said CPU and said network for communicating with said dedicated processors and said CPU and performing one or more other predetermined functions;
means for arbitrating between said dedicated processors during a condition when said dedicated processors are contending for said network at substantially the same time and for allowing only one of said dedicated processors to communicate with the network at one time; and
means for allowing and controlling communication between said dedicated processors and said peripheral devices and between said SCP, said dedicated processors and said network and between said SCP and said CPU.

19. A computer system as recited in claim 18, further including means for allowing communication between said dedicated processors.

20. A computer system as recited in claim 19, wherein said allowing means includes first means for allowing each dedicated processor to communicate with one other dedicated processor at one time.

21. A computer system as recited in claim 19, wherein said allowing means includes second means for allowing each dedicated processor to communicate with all of the other dedicated processors at one time.

22. A computer system as recited in claim 18, wherein said serial bus is a two-line bus which includes a transmit/receive line and a BUSY line.

* * * * *

UNITED STATES PATENT AND TRADEMARK OFFICE
CERTIFICATE OF CORRECTION

PATENT NO. : 5,280,621

DATED : January 18, 1994

INVENTOR(S) : Barnes et al.

Page 1 of 3

It is certified that error appears in the above-indentified patent and that said Letters Patent is hereby corrected as shown below:

Title page, item [57] col. 2

IN THE ABSTRACT:

line 2, delete "the".

Column 2, line 19, change "DRAWING" to --DRAWINGS--;

line 23, change "drawing" to --drawings--.

Column 4, lines 29-30, change "processor" to --processors--;

lines 38-39, change "processor" to --processors--;

line 39, after "Thus," delete "a".

UNITED STATES PATENT AND TRADEMARK OFFICE
CERTIFICATE OF CORRECTION

PATENT NO. : 5,280,621  
DATED : January 18, 1994  
INVENTOR(S) : Barnes et al.

Page 2 of 3

It is certified that error appears in the above-indentified patent and that said Letters Patent is hereby corrected as shown below:

Column 5, line 19, change "r presents" to --represents--;

line 66, change "indicated" to --indicates--.

Column 6, line 13, delete "(" before "basic";

line 32, after "keyboard" delete "value".

Column 7, line 41, delete "are" (second occurrence).

Column 8, line 38, change "BUSY" to --/BUSY--.

Column 9, line 21, after "bus" insert --.--;

line 65, change "optical" to --optional--.

Column 10, line 3, change "8-bit" to --8-BIT--;

UNITED STATES PATENT AND TRADEMARK OFFICE
CERTIFICATE OF CORRECTION

PATENT NO. : 5,280,621
DATED : January 18, 1994
INVENTOR(S) : Barnes et al.

It is certified that error appears in the above-indentified patent and that said Letters Patent is hereby corrected as shown below:

Column 10, line 16, change "that is DEST/CMD" to --that it is a DEST/CMD--;

line 22, change "it if" to --if it--.

Column 10, line 53, after "unit" insert --(CPU)--.

Column 11, lines 46-47, change "processors" to --processor--.

Column 12, line 22, change "CPU:" to --CPU;--.

Signed and Sealed this

Ninth Day of August, 1994

BRUCE LEHMAN

Attest:

Attesting Officer

Commissioner of Patents and Trademarks